United States Patent
Gallagher

(10) Patent No.: US 6,407,674 B1
(45) Date of Patent: *Jun. 18, 2002

(54) REFLECTIVITY MEASURING APPARATUS AND METHOD

(76) Inventor: Philip Anthony Gallagher, 50 Ashley St., Hamilton (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,680
(22) PCT Filed: Mar. 5, 1998
(86) PCT No.: PCT/NZ98/00028
§ 371 (c)(1),
(2), (4) Date: Sep. 7, 1999
(87) PCT Pub. No.: WO98/39635
PCT Pub. Date: Sep. 11, 1998

(30) Foreign Application Priority Data

Mar. 5, 1997 (NZ) .................................. 314352

(51) Int. Cl.[7] ................................................ G08G 1/09
(52) U.S. Cl. ..................... 340/905; 340/901; 340/904; 356/445
(58) Field of Search ................................ 340/905, 901, 340/904, 988, 425.5; 356/445, 446, 447, 448

(56) References Cited

U.S. PATENT DOCUMENTS

| 2,750,583 | A | * | 6/1956 | McCullough | 340/901 |
| 4,373,819 | A | * | 2/1983 | Pallotta | 356/445 |
| 4,505,590 | A | * | 3/1985 | Heenan | 356/445 |
| 4,721,389 | A | * | 1/1988 | Dejaiffe | 356/445 |
| 4,856,931 | A | * | 8/1989 | Bollag | 404/75 |
| 5,774,070 | A | * | 6/1998 | Rendon | 340/905 |

* cited by examiner

Primary Examiner—Brent A. Swarthout
(74) Attorney, Agent, or Firm—Synnestvedt & Lechner LLP

(57) ABSTRACT

This invention relates to reflectivity measuring apparatus. This invention provides reflectivity measuring apparatus for assessing the integrity of road markings including a light source, a light sensor and a processing means, the apparatus being mounted on a vehicle such that, in use, the light source illuminates a reflective surface on a road marking, and wherein the light sensor detects any reflected light and the data signal is received by the processing means, the processing means processes the data to provide information on the reflectivity of a said reflective surface. In another aspect of the invention there is provided a computer controlled process for determining the integrity of light reflective road markings, the computer being programmed to carry out the steps of getting data on the reflectance levels of road markings; calibrating the data by multiplying the data with a predetermined calibration factor; and determining whether the road marking meets a predetermined acceptable reflectance level.

11 Claims, 4 Drawing Sheets

REFLECTIVITY MEASURING APPARATUS AND METHOD

TECHNICAL FIELD

This invention relates to reflectivity measuring apparatus. More particularly, but not exclusively, this invention relates to a method and apparatus for assessing the integrity of road markers and markings.

BACKGROUND ART

Light reflective road markings and markers are extensively used to demarcate vehicle lanes and supply vital information to drivers about sections of road. They function by reflecting or retroreflecting light rays entering the reflective material of the road marking back to a driver. This is achieved, for example, by a vehicle's headlights beaming onto the road marking. Road markings include coloured lines of varying composition and markers such as raised pavement markers (RPM's). Maintaining the reflectivity of road markings is an important aspect of road safety.

Road markings, and in particular RPM's, are periodically tested to ensure they continue to meet minimum standards of reflectivity/retroreflectivity. Many road authorities stipulate a minimum acceptable reflectance value for an RPM. A conventional method of checking RPM's is by way of night time drivebys using headlights whereby personnel visually assess each RPM and tag any that appear to reflect a low level of light. RPM's can then be replaced at that time or replaced at a later date. Disadvantages with this method include being restricted to night-time testing; visual assessments are subjective and can vary between different tests and personnel which can result in erroneous results and the unnecessary replacement of RPM's; assessment conditions such as vehicle headlight strength and angles, speed, oncoming traffic and weather conditions can contribute to erroneous diagnoses; and auditing of personnel and their assessments can be difficult and subjective. These disadvantages can result in inefficient expenditure on road markings.

An alternative known method is to use a portable hand held measuring instrument. In this case, operators walk beside road markings and take measurements at spaced distances along a section of road. Disadvantages with this method include the amount of time required to cover sections of road and take measurements, road closure delays causing an inconvenience to motorists, a high cost to roading authorities, an unacceptable risk to users who are exposed to road traffic and pollution on sections of road such as motorways and tunnels.

In the case of RPM's, they are generally secured to the centreline or to lines separating lanes and have two highly reflective surfaces to reflect light from a vehicle's headlights back to its driver. The reflected light offers an aid to night time driving. As RPM's are generally devices made of a plastics material and raised above the road level, they deteriorate quickly due to repeated tyre abuse. Therefore, they require regular integrity checks and maintenance.

It is an object of the present invention to provide a method and apparatus for testing the integrity of road markings which overcomes at least some of the abovementioned problems, or which at least provides the public with a useful choice.

SUMMARY OF THE INVENTION

In a first broad aspect of the invention there is provided a reflectivity measuring apparatus for testing the integrity of road markings including a light source, a light sensor and a processing means, the apparatus being mounted on a vehicle such that, in use, the light source illuminates a reflective surface on a road marking, and wherein the light sensor detects any reflected light and the data signal is received by the processing means, the processing means processes the data to provide information on the reflectivity of a said reflective surface.

Preferably the apparatus further provides a locating means for determining the location of a road marking. Desirably the location means is a global positioning system or a vehicle gearbox revolution sensor.

Advantageously a plurality of light sensors are provided to cover a wide field of view, each said light sensor detecting any reflected light from a different area of road and providing a data signal to the processing means representing the reflectivity of each said area of road.

Preferably the apparatus further comprising an audio and/or visual means to provide an indication of the location of the said road markings relative to the vehicle.

Preferably a plurality of said light sources and a plurality of said light sensors provide simultaneous testing of a plurality of said road markings. Desirably the light source and the light sensor are adjustable. Preferably the light sensor is mounted in front of a corresponding said light source.

Desirably the processing means stores data measured on the reflectance level and location of each said road marking tested. Preferably a predetermined acceptable reflectance level for the road marking is obtained as a reference reflectance level against which each said road marker being tested is compared by the processing means. Preferably the processing means is a computer.

Desirably the apparatus further comprises a tagging means for identifying said road markings that do not meet the predetermined acceptable reflectance level. Preferably the tagging means includes a paint capsule dispenser activatable by the processing means.

Preferably the said road markings are raised pavement markers with at least one reflective surface.

In another aspect of the invention there is provided a computer controlled process for determining the integrity of reflective road markings, the computer being programmed to carry out the steps of:
 a. getting data on the reflectance levels of road markings;
 b. calibrating the data by multiplying the data with a predetermined calibration factor; and
 c. determining whether the road marking meets a predetermined acceptable reflectance level.

Preferably the process further includes the step of filtering the data by calculating an average reflectance level from a set of sampled data.

Preferably the process further includes the step of getting data from a vehicle gearbox revolution sensor and determining the distance travelled from the start position of the road marking test so as to determine the location of each road marking.

Preferably the process further includes the step of activating a road marker tagging means to tag a road marker if it is determined as having a reflectivity level which does not meet the predetermined acceptable reflectance level.

Preferably the process further includes the step of storing on any suitable medium the location and reflectivity level of each road marker.

Preferably the process further includes the step of determining the location of any missing road markers by recognising patterns in existing road marker locations and with being provided with information on the spacing of known valid road markers.

Preferably the process further includes the further step of converting data to a format for presentation in either a graphical or numerical form, and be viewed in real time on a monitor or in printed form.

BRIEF DESCRIPTION OF THE DRAWINGS

Preferred embodiments of the invention will now be illustrated, by way of example only, with reference to the accompanying drawings in which.

DETAILED DESCRIPTION OF THE DRAWINGS

Figure 1:
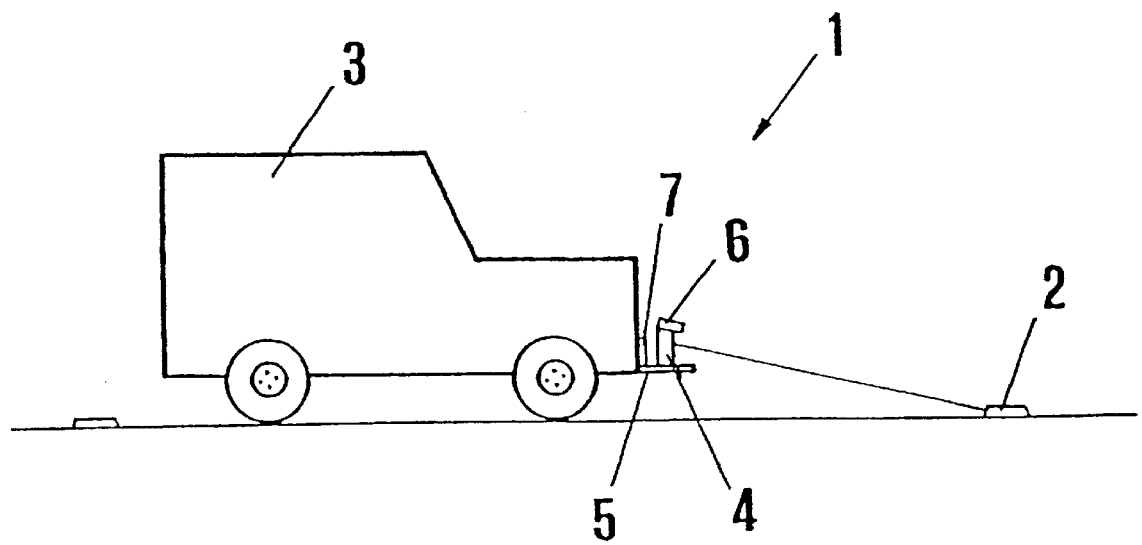
FIG. 1: illustrates a side view of a reflectivity measuring apparatus according to a preferred embodiment of the invention.
Figure 2:
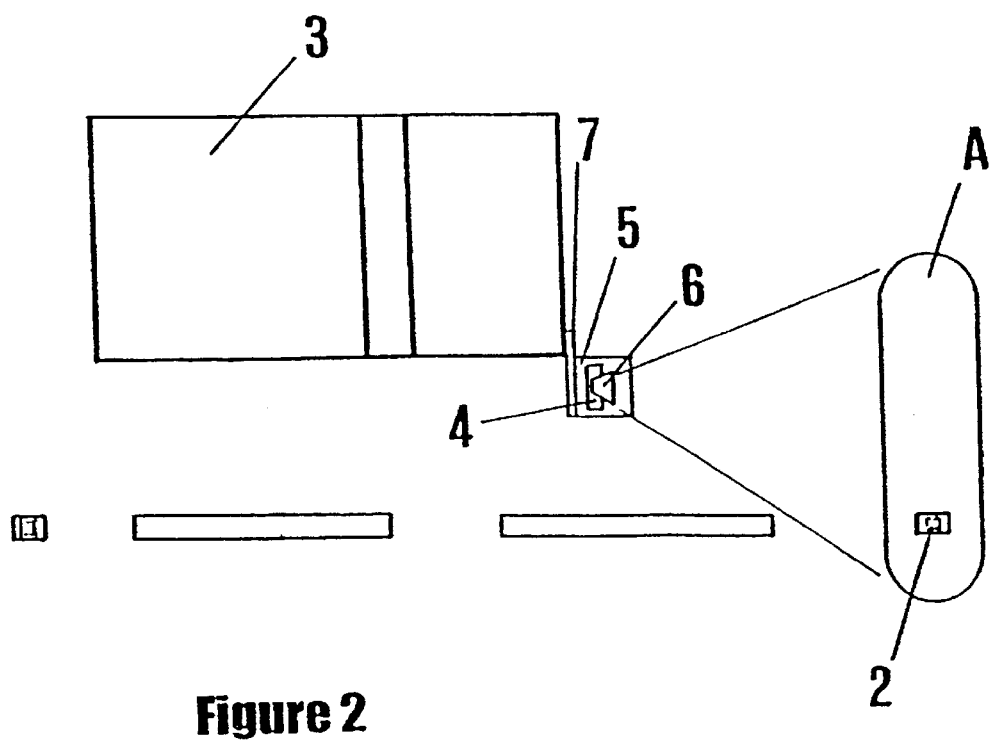
FIG. 2: illustrates a top view of the reflectivity measuring apparatus of FIG. 1.

Referring to FIGS. 1 and 2, in a first preferred embodiment of a reflectivity measuring apparatus, generally indicated by 1, according to a broad aspect of the invention, is illustrated.

The apparatus 1 is designed to measure the reflectivity of road markings 2 when in transit. The apparatus 1 is mounted on a moveable platform in the form of a vehicle 3. The apparatus 1 can obtain reflectivity measurements, inter alia, with the vehicle 3 travelling at speeds of up to about 100 kph. This means that testing can be carried out alongside other vehicles on a road without being an inconvenience or impediment to the normal flow of traffic.

The apparatus 1 can test the reflectivity of a wide variety of reflective road markings and road markers such as, for example, road signs and posts, reflective painted lines whether continuous or broken, and more particularly raised pavement markers. For simplicity the description of the preferred embodiment of the invention will be limited to raised pavement markers 2 (referred to herein as "markers"). However, it will be appreciated by those skilled in the art that the apparatus 1 can be adapted to measure other types of reflective markings on or adjacent the road.

Markers 2 are generally fastened or secured along lanes, particularly the centreline of a road, every 5 to 20 metres, more or less. They can have two reflective surfaces facing vehicles in either direction on the road. In some countries such as Australia they are, in some areas, mounted in pairs on either side of the centreline. The marker faces are designed to reflect light from a vehicle's headlights back to its driver. The reflected light offers guidance to drivers on the location of lanes demarcating a road.

The apparatus requires a light source 4 in the form of a standard vehicle headlight such as to achieve a real life response from the markers 2. A continuous 12V, 100 W sealed beam unit is suitable and is powered by a stable power supply 12. The light source 4 is of relatively constant and even intensity when a wide beam is projected about 2.3 meters from a platform or unit 5 located at the front of the vehicle 3 to cover a 3 metre by 0.5 metre area. Area A defines the test area for the apparatus 1.

The positioning of the unit 5 is at a lower height than a normal vehicle headlight to obtain the correct light source and sensor angles. The incident angle between the angle of the beam to road level is held constant over any one test and is generally between about 1 to 30 degrees, but preferably between about 13 and 17 degrees. The incident angle is adjustable but is set to account for factors such as testing markers 2 around bends and on undulating roads. A reflected light results from the beam illuminating the forward face 6 of a marker 2. It is this reflected light that is measurable in a quantitative way by aspects of the invention.

It will be appreciated a wide variety of light sources can be suitable for this form of testing. A narrow or wide beam could be used. The advantage with a wide beam is that a wider workable area A is achievable and a feedback system to alert an operator of any vehicle 3 wandering is provided. The beam projects a short distance to account for various road conditions and placement of markers.

A light sensor 6 detects the reflected light from a marker 2. In this embodiment sensor arrays containing a plurality of sensors, generally five or ten, are advantageously aligned in an encased module 6a to increase the field of view of the apparatus 1. The module 6a is adjustable to increase the accuracy of the measurements.

The sensors are photodiodes mounted precisely on the module 6a at a height and angle to properly detect reflected light. A variety of light sensors are envisaged as being suitable in the apparatus 1. In the case of sensing coloured markers, light sensors with different spectral responses or similar light sensors with different filters can be used. The data signals detected by the sensors will indicate the colour of a road marking being tested. This feature is useful in situations where the apparatus 1 is being used to test different coloured road markings simultaneously.

In a situation where markers are arranged side by side on either side of a centreline, a higher number of light sensors, desirably about ten light sensors, are mounted in a sensor array or module 6a. Each sensor is arranged to detect reflected light from a relatively small viewing angle. Reflected light from these markers can be detected simultaneously by desirably two of the light sensors.

The light sensor module 6a is mounted forward of the light source 4 to increase the signal strength and to reduce the observation angle to almost zero. The observation angle is the angle between the incident and reflected light and is generally about 0.2 degrees. The angle can be adjusted to account for roading authorities standards.

The unit 5 is mounted to the vehicle 3 by brackets 7. The unit 5 should be rigidly mounted to minimise vibrations. To allow the vehicle 3 to be driven normally in a lane on a road, the unit 5 is mounted to the side of the vehicle 3.

It will be appreciated the test area A may be varied as required. This can be done by selecting a light source 4 with a desirable width of beam. The additional width of beam may be desirable for testing markers 2 that are spaced apart on the road. Additional light sensors 6 may be used in such circumstances.

Figure 3:
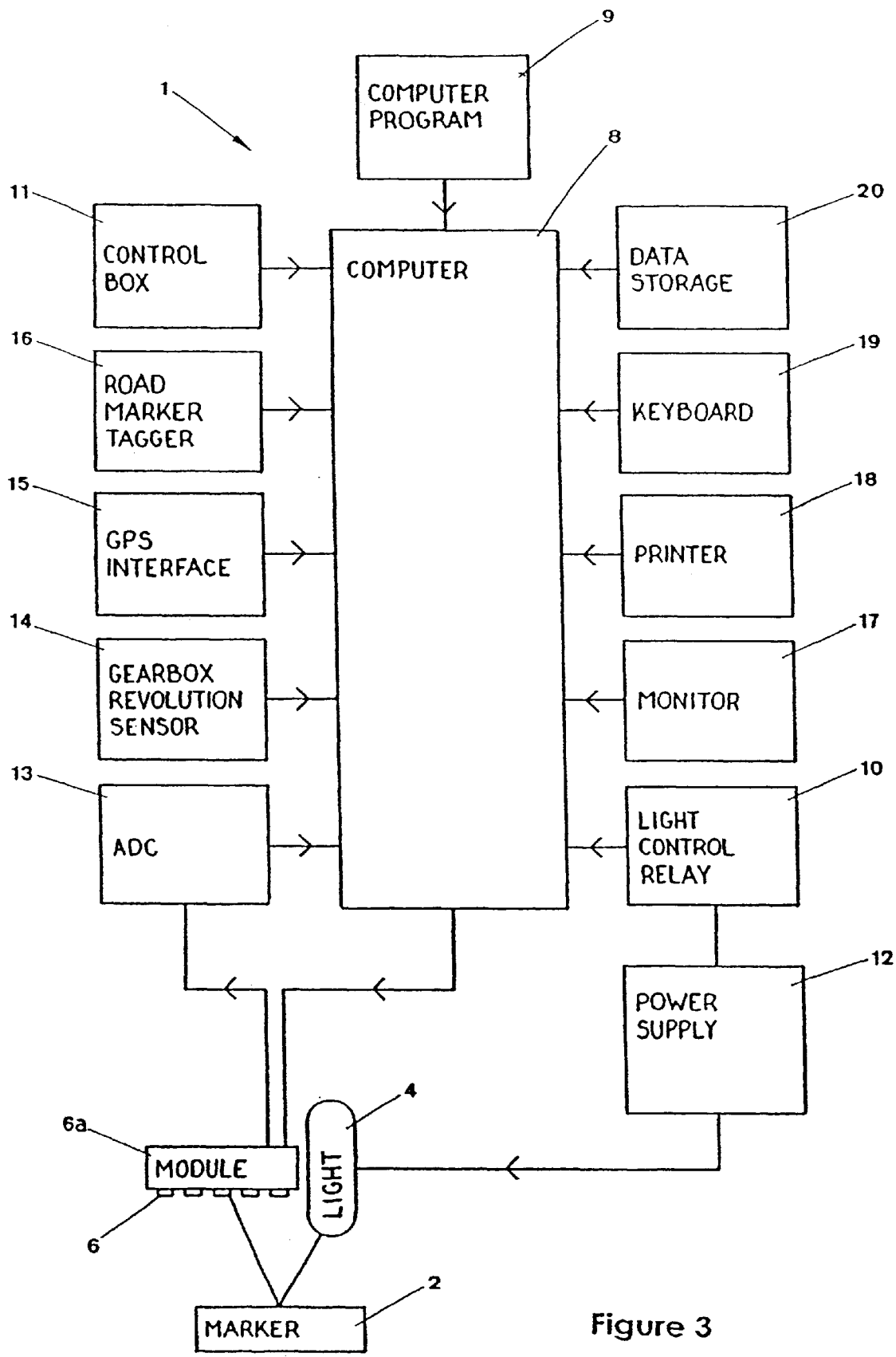
FIG. 3: illustrates a block diagram of components of the reflectivity measuring apparatus according to the preferred embodiment of the invention.

Referring now also to FIG. 3, a block diagram of components of the apparatus 1 according to the preferred embodiment, is illustrated. The various components are arranged and configured to obtain the required information to conduct the reflectivity tests.

The processing means is in the form of a computer 8 programmed by a computer program 9 to carry out a method of testing the integrity of road markings according to an aspect of the invention.

In operation, an operator in the vehicle 3 initiates the measurement process by sending a signal via the computer 8 to activate the light control relay 10. This is conveniently achieved by using a control box 11 located by the operator in the vehicle 3. The relay 10 switches power from the power supply 12 to the light source 4. The light source 4 subsequently illuminates a reflective surface of a marker 2 and the reflected light is detected by one or a number of the light sensors 6 in the module 6a which has been aligned to detect light from a particular area of road.

The output analogue signal is fed to an analogue to digital converter (ADC) 13 with the resultant output digital signal or data being received by the computer 8. An analogue to digital multifunction data acquisition card with a high sampling rate and range of data collection options is used as the ADC 13. The sampling rate is desirably at about 10 kHz which means the apparatus 1 is capable of sampling road marking reflectance level data at frequent intervals.

Location means for determining the location of the markers 2 is also obtained to allow identification of each marker 2 being tested. A gearbox revolution sensor 14 is used to obtain a measurement of the speed of the vehicle 3 and the distance travelled from a reference point. Alternatively a GPS interface 15 can be used to pinpoint the position of the vehicle and/or markers 2 as measurements are being taken.

The computer 8 is programmed to analyse the data collected by the apparatus 1. As the processing steps are carried out within a short period of time, the apparatus 1 is capable of tagging physically any markers 2 in the test run that do not meet the predetermined minimum acceptable reflectance level. This is achieved using a road marker tagging means 16.

The computer 8 is a standard computer, and desirably a laptop for convenience purposes. The processing speed and technical specifications of the computer 8 should be powerful enough to be capable of processing the incoming data from the ADC 13 and vehicle gearbox and/or GPS sensors.

In operation, if the computer program determines that a marker 2 does not meet the minimum acceptable reflectance level, a signal will be sent to the tagging means 16 to tag the faulty or unacceptable marker 2. This can be done as the vehicle 3 is passing any faulty markers.

The processed data may be viewed on a computer monitor 17 or be printed by printer 18. An operator can also select computer function options and input reference data via a keyboard 19. Data storage medium 20 in the form of a hard disc or floppy drive is used. Further details of the computer program used to carry out the testing is described below and in the algorithms illustrated.

Figure 4:
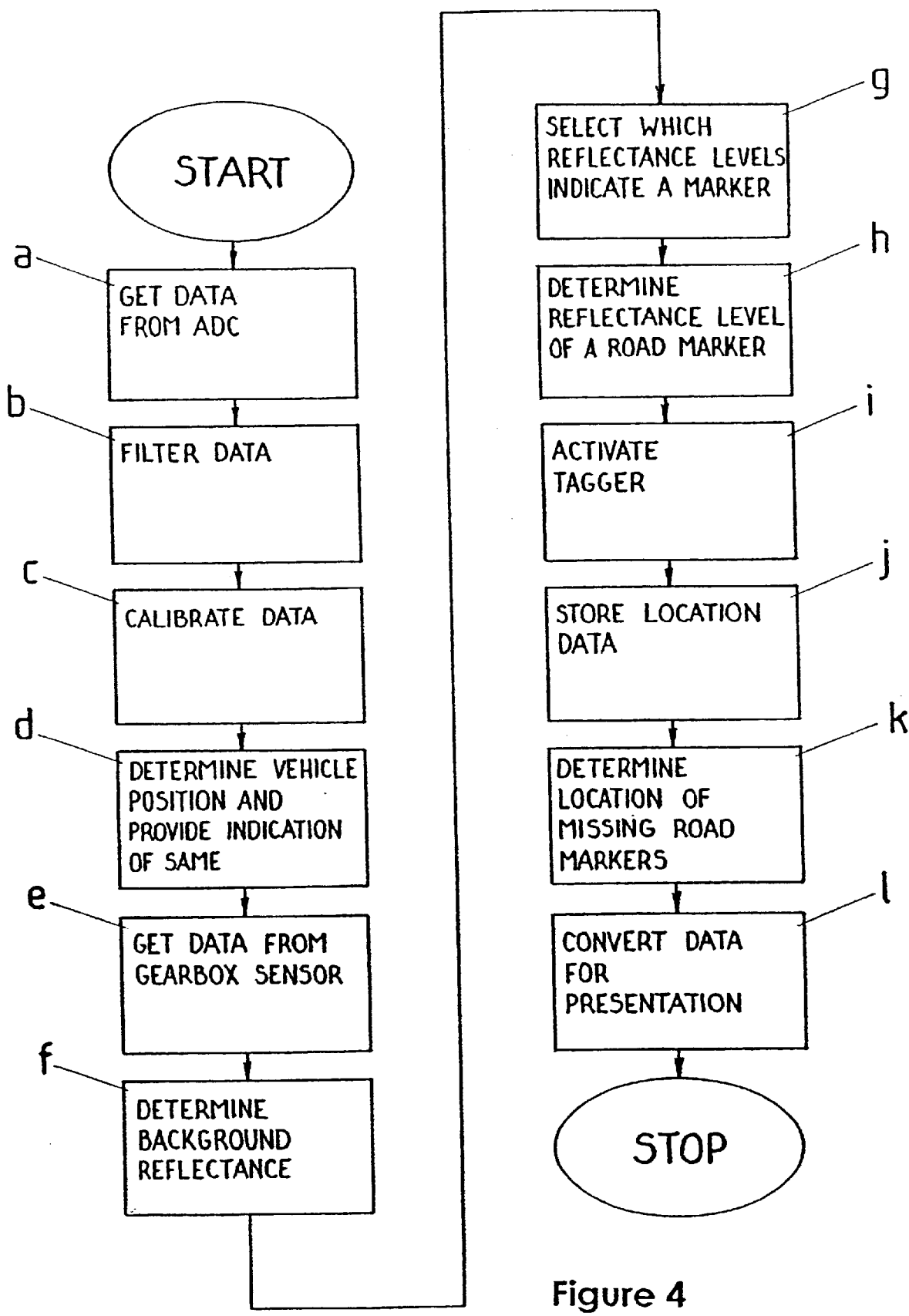
FIG. 4: illustrates a flow chart of the computer software algorithm controlling the computer according to an aspect of the invention.

Referring now to FIG. 4, a flow chart of the algorithm controlling the computer 8 according to an aspect of the invention, is illustrated.

The process of the preferred embodiment of the present invention employs an algorithm characterised by a series of steps for determining the integrity of particular road markings on a road being tested and storing and/or displaying the results.

The computer controlled process is initiated via control box 11 to operate the computer 8.

The first process step a includes getting the data from the output of the ADC 13 on the reflected light detected by the light sensors 6. As multiple sensors are desirably used, each light sensor 6 requires a separate data channel.

Process step b. includes filtering the data by calculating the average reflectance level from a set of sampled data from each sensor to smooth out fluctuations caused by mechanical vibrations, road imperfections, electrical interference and noise and the like.

Process step c. involves calibrating the data by multiplying the data with a predetermined calibration factor to calibrate for different positions in the light sensor module 6a.

The calibration factor for a range of markers can be obtained by conducting static tests in a laboratory, and additionally with checks on the road. One type of static test is to mount markers on a conveyor belt at even distances apart and to arrange the apparatus 1 to measure the reflectivity of the markers. Multiple static tests at different tracking distances are also conducted to calculate accurate calibration factors for each individual sensor in the array.

Process step d. involves determining the vehicle position on the road and providing an audio and/or visual indicator means for the operator of the vehicle 3. This enables the operator to maintain the vehicle 3 in a proper position on the road to allow the apparatus 1 to obtain reflectivity measurements. As each of the five light sensors 6 covers a section of the area A and data from each light sensor is received showing the reflectance levels across area A of the road, then given that background reflectance levels on non road marking sections of the road are low and road markers 2 are relatively high, the computer program can detect which light sensor 6 is reading the highest reflectance reading and to provide the operator with that information.

The operator will desirably have the most central of the light sensors 6 detecting the highest reflectance levels. That way if the vehicle 3 wanders, the outer light sensors will detect the highest reflectance levels from the markers 2 to prevent invalid test runs being conducted.

The indicator signal means is an audio and/or visual signal from the control box 11 which aids the operator in maintaining the correct position of the vehicle 3 and hence the apparatus 1 on the proper course when measurements are being taken.

Process step e. involves getting data from the vehicle gearbox revolution sensor 14 and determining the distance travelled from the start position of the road marking test so as to determine the location of each road marking.

This information is used to tag or identify the road markers tested along a stretch of road.

Process step f. involves determining the background reflectance level on the road and establishing non-marker reflectance levels.

Process step g. involves selecting, from data obtained in step a., which reflectance levels indicate a road marker. In the case of road markers the peak responses sensed are determined as the highly reflective surfaces of a road marker.

Process step h. involves determining the reflectance level of the road marker in a value of millicandela per Lux (CIL) or as a percentage of the predetermined standard reflectance level.

Process step i. involves activating the tagging means 16 to tag a road marker if it is determined as measuring a reflectivity less than the predetermined minimum acceptable reflectance level. It will be appreciated that by tagging the road marker, it can later be identified and replaced as required.

Process step j. involves storing on any suitable medium, such as a hard disk or floppy disk, the location and CIL levels of each road marker.

Process step k. involves determining the location of any missing road markers by recognising patterns in existing road marker locations and according to known valid road marker spacings.

Process step l. involves converting data to a format for presentation in either a graphical or numerical form, and be viewed in real time on a monitor or in printed form.

An advantage is attained by having measurements made in real time as the results of a test run can be viewed in graphical or numerical tabled form on the computer monitor 17 and an assessment made as to whether the apparatus is measuring accurately or not.

The data obtained on the reflectance level and location of each road marking tested can be stored and later used in a rerun of a stretch of road tested earlier. An additional process step can enable the apparatus 1 to be used for a rerun. In operation, the computer 8 will issue a visual and/or audio signal to indicate to an operator the location of any defective road markings for replacement. This feature is particularly desirable in that information and test runs can be conducted at night and markers can be replaced during the day.

It will be appreciated that more than one unit 5 can be mounted on the vehicle 3 to be used to obtain reflectance levels from opposing reflective surfaces of a road marker. In this case, an additional processing step in the algorithm can be used to match the reflectance levels measured from the bi directional faces of a road marker to be analysed, stored and displayed. Further, dual sets of light sources and light sensors can be mounted in opposite directions in one unit 5. This is generally the side adjacent the centreline where bi directional markers are operating. This way, both faces of a marker 2 can be tested in one pass by the apparatus 1.

In the case of having three sets of light sources and sensors, the computer 8 is capable of simultaneously processing data obtained by the light sensors.

It will be further appreciated that further analyses of the data is commercial useful such as calculating the number of markers tested, the percentage of markers measuring lower than the predetermined acceptable reflectance level, and the like. Further programming steps and routines could be included in the processing steps to tailor the particular application required.

As roading authorities worldwide invariably advocate different standards for road markings, the computer program is envisaged as displaying the analysed data from a test in a way and to an extent that meets the criteria of each country.

Figure 5:
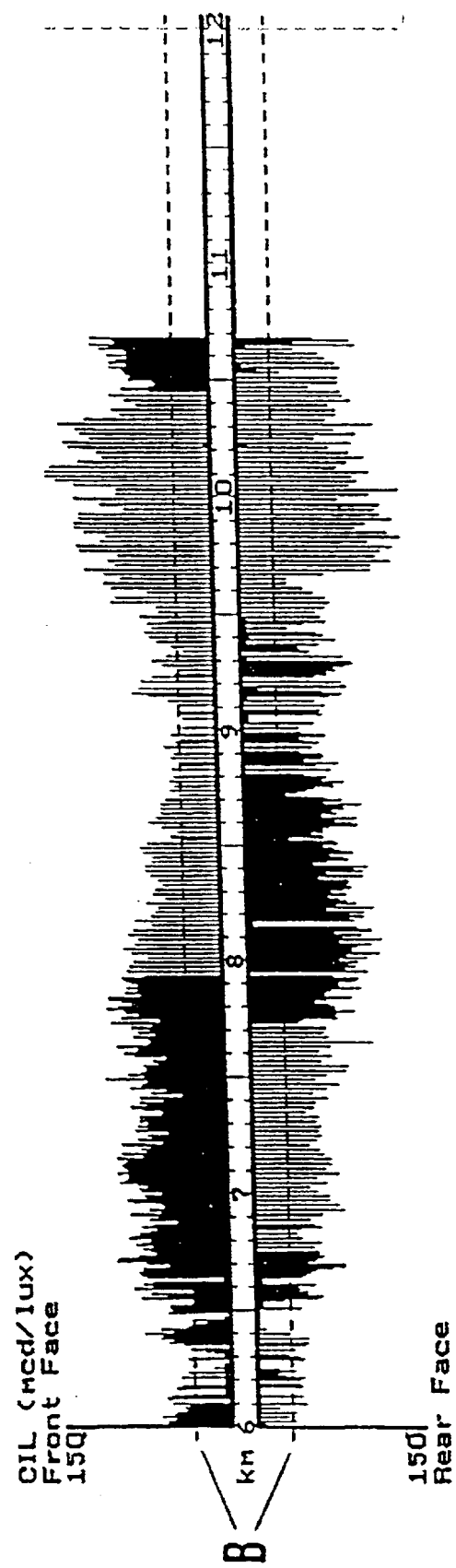
FIG. 5: illustrates a diagram of the reflectance levels of a number of road markings on a stretch of road.

Referring now to FIG. 5, a diagram representing the reflective levels measured from a number of road markings on a stretch of road, is illustrated.

The x component represents the location of each marker 2 and the distance travelled in kilometres from the start point in the test run. In the diagram shown the distance of 6 km from the 6 km point is displayed. The y component represents the reflectance levels of the front face of each marker 2 in millicandella (mcd/lux). The negative y component shows the reflectance level of the rear face of each marker 2. The threshold minimum acceptable reflectance level B is displayed for easy reference of the defective markers 2 measured.

The graphical displays of test results can be viewed in real time by an operator as a check that tests are being conducted properly or at a later date for auditing purposes or otherwise.

Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

What is claimed is:

1. A reflectivity measuring apparatus for testing the integrity of reflective road or pavement markings, the apparatus including a light source, a light sensor and a processing means, the apparatus being mountable on a vehicle such that, in use, the light source illuminates a reflective surface on a reflective road marking, a plurality of light sensors are provided to cover a wide field of view, each said light sensor detecting any reflected light from a different area of road and providing a data signal to the processing means representing the reflectivity of each said area of road, and wherein the light sensors detect any reflected light and the data signal is received by the processing means, the processing means processes the data to provide information on the reflectivity of a said reflective surface on the road marking, and further including a visual display means associated with and controllable by the processing means to provide an indication of the location of the road markings relative to the vehicle to the vehicle operator to enable the vehicle operator to maintain the moving vehicle in an appropriate position and normal traveling speed during use of the apparatus.

2. An apparatus according to claim 1 further providing a locating means for determining the location of a road marking.

3. An apparatus according to claim 1 wherein a plurality of said light sources and the plurality of light sensors provide simultaneous testing of a plurality of said road markings.

4. An apparatus according to claim 1 wherein a predetermined acceptable reflectance level for the road marking is obtained as a reference reflectance level against which each said road marker being tested is compared by the processing means.

5. An apparatus according to claim 1 further comprising a tagging means for identifying said road markings that do not meet the predetermined acceptable reflectance level.

6. An apparatus according to claim 5 wherein the tagging means includes a paint capsule dispenser activatable by the processing means.

7. A computer controlled process for determining the integrity of reflective road or pavement markings, the computer being programmed to carry out the steps of:

a. getting data on measured reflectance levels of road markings;

b. calibrating the data by multiplying the data with a predetermined calibration factor;

c. determining whether a road marking meets a predetermined acceptable reflectance level; and d. determining the location of the road markings relative to a moving vehicle from which the measured reflectance levels are being taken and providing a visual display means associated with and controllable by the processing means to provide an indication of the location of the road marking relative to the vehicle to enable the vehicle operator to maintain the moving vehicle in an appropriate position and normal traveling speed during use of the apparatus.

8. The process of claim 7 including the step of filtering the data by calculating an average reflectance level from a set of sampled data.

9. The process of claim 7 including the step of activating a road marker tagging means to tag a said road marker if it is determined as having a reflectivity level which does not meet the predetermined acceptable reflectance level.

10. The process of claim 7 including the step of determining the location of any missing road markers by recognizing patterns in existing road marker locations and comparing with information on the spacing of known valid road markers.

11. The process of claim 7 including the further step of converting data to a format for presentation in either a graphical or numerical form, viewable either in real time on a computer monitor or printed.

* * * * *